Jan. 31, 1961 S. D. IVAN 2,969,690
TRANSMISSION SHIFT LOCK
Filed July 13, 1959 2 Sheets-Sheet 1
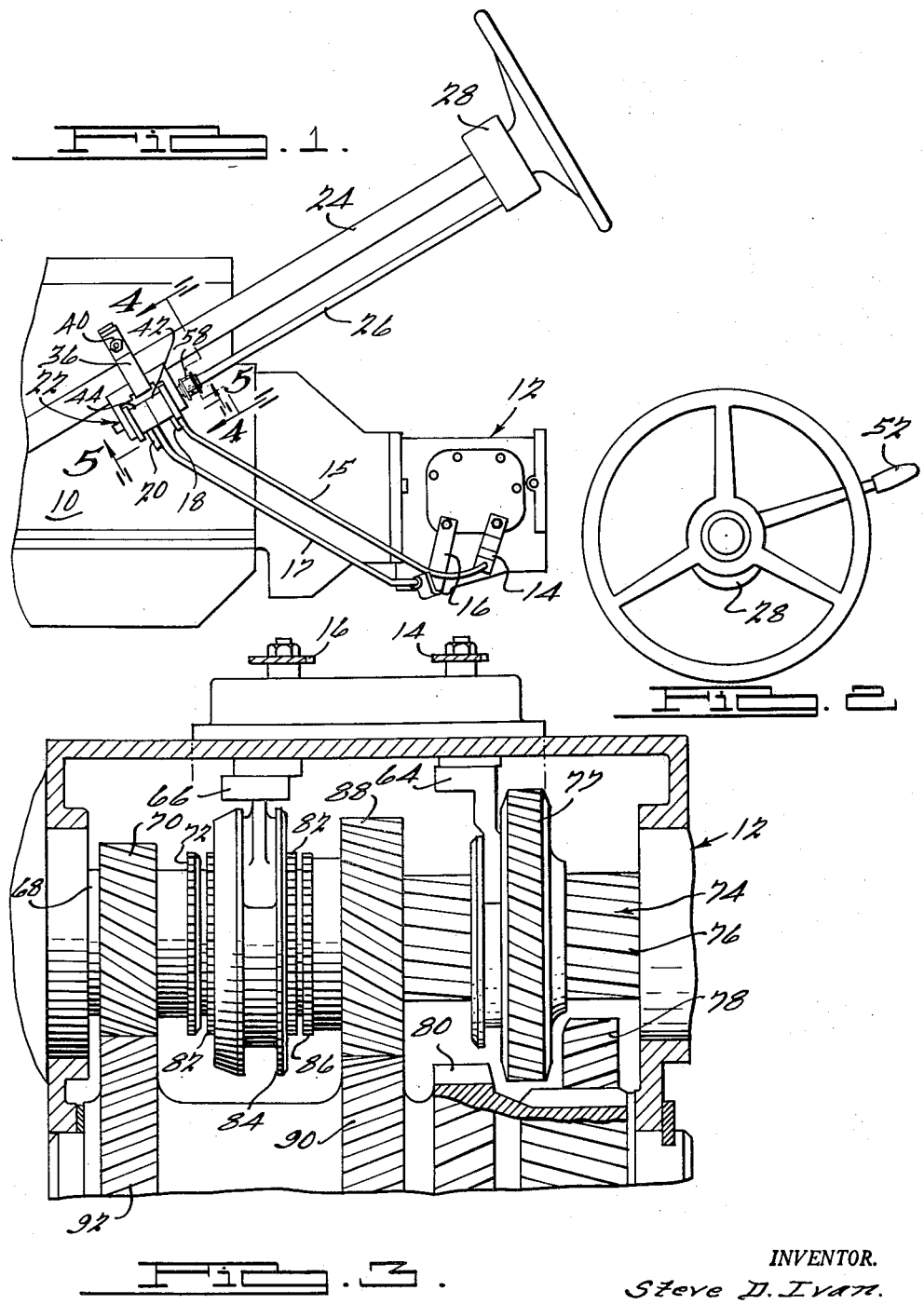
INVENTOR.
Steve D. Ivan.
BY
Harness and Harris
ATTORNEYS.

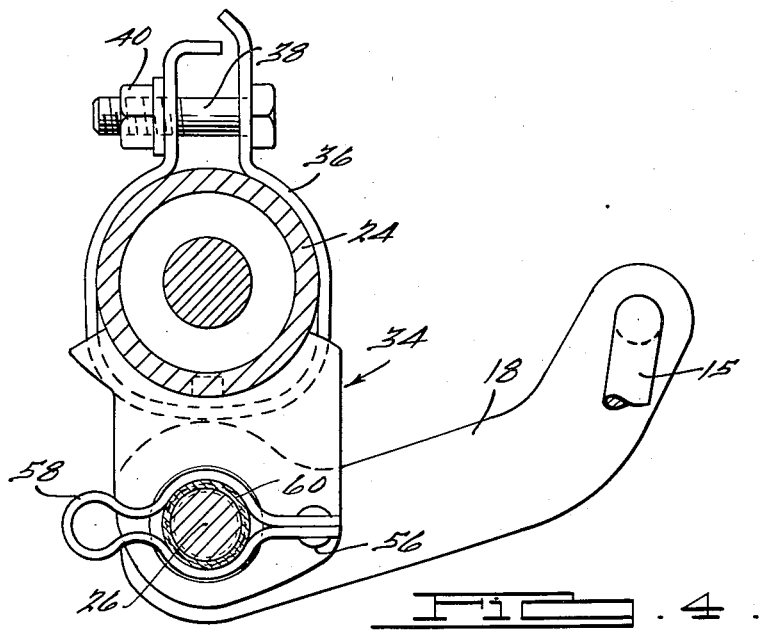
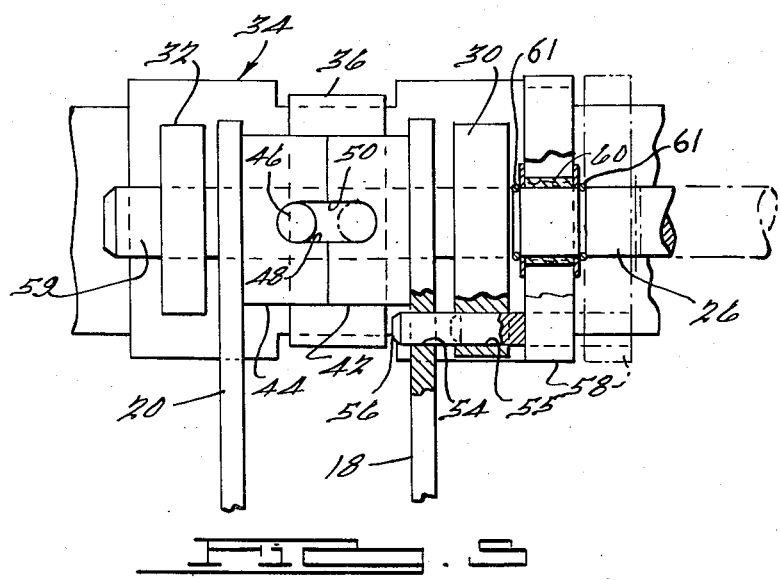

United States Patent Office 2,969,690
Patented Jan. 31, 1961

2,969,690

TRANSMISSION SHIFT LOCK

Steve D. Ivan, Roseville, Mich., assignor to Chrysler Corporation, Highland Park, Mich., a corporation of Delaware Filed July 13, 1959, Ser. No. 826,797

2 Claims. (Cl. 74—477)

This invention relates to shifting means for transmissions and particularly concerns a novel locking feature for preventing movement of the low and reverse range shift lever from its neutral position during the shifting of the transmission gears into second or high range, and also concerns a friction snub feature for preventing shaking of the transmission shifting cane.

It is conventional in manual shifting apparatus for automotive and other type transmissions to employ a gearshift cane which is selectively engageable by movement thereof by the operator with a pair of collars having shifting levers associated therewith for selectively shifting the transmission gears into the second and high range with one lever and into the low and reverse range with the other lever. The present invention is mainly concerned with the feature of a lever locking means associated with the collars, the shifting cane and the shifting levers, and also with the feature of a cane snubbing friction element associated with the cane and a portion of the locking means.

In using the above manual shifting apparatus with the standard transmission of Figure 3, under certain conditions, it is possible to strip the transmission gears by causing the simultaneous engagement of the low-reverse range gear and the second-high range gear with a common shaft. This happens as follows:

During the shift, all parts in the first-reverse gear system are forcibly moved out of the first gear until crossover of the shifting pin from the first-reverse collar to the second-high collar occurs. When this crossover occurs the force on the shift linkage is transferred into the second-high collar ind linkage system and the second gear is locked to the drive and driven shafts. However, in some instances, for example, in a rapid shift from first to second, the first-reverse range gear and linkage would continue to travel under their own inertia until the first-reverse gear struck the oppositely rotating reverse drive gear whereupon it would rebound past neutral position into partial engagement in first gear. This rebounding is caused by the cam action between the teeth of the reverse drive gear 78 and the driven gear 77. It is noted that as the shift from first to second occurs, the reverse gear 78 is turning quite rapidly under normal conditions and imparts quite a rebounding thrust to the gear 77 to throw it into partial engagement with first drive gear 80. If the clutch is engaged and torque applied to the drive gearing system immediately after the shift from first to second with the first drive and driven gears partially engaged and the second drive and driven gears engaged, either or both sets of gears are very likely to be damaged. Applicant's lever locking means prevents this situation by positively locking the first-reverse driven gear in neutral during and after shifting of the second-high driven gear into operation.

Moreover, in order to reduce or eliminate shift lever shake which is objectionable in that it may throw the transmission into neutral or an undesirable gear range, a controlled friction snubbing is introduced at the shifting cane by a spring and friction material forming part of the lever lock means and adapted to hinder only angular or rotative movement of the cane. This snubbing permits the shaking forces on the shift cane caused by movement of the engine and transmission on their mounts relative to the car body, to be fully or partially absorbed in the linkage joint clearances which are in the shift linkage system between the snubber and the transmission to thereby prevent undue movement of the shift levers on the transmission.

It is a principal object, therefore, of this invention to provide a novel type of locking means to prevent movement of the low-reverse gear shift lever during shifting of the second-high gear.

Another object is to provide a frictional rotation resistance means on the shifting cane and lever lock means to prevent the cane from rotating due to vibration of the conveyance or engine thereof which rotation may cause the shifting levers to shift the gears of the transmission without the aid or intention of the operator.

A specific object of this invention is to provide a combination transmission shift locking means and shifting cane anti-rotation means for cooperatively preventing undesirable movement of the transmission shifting levers and gears.

Further objects and advantages of the present invention will become apparent from the following description and drawings, in which:

Figure 1 represents a side elevational view of a vehicle transmission and transmission shifting mechanism;

Figure 2 represents a top plan view of the manual gearshift of Figure 1;

Figure 3 represents a partially broken-away view of the transmission of Figure 1 showing the gearing therein;

Figure 4 represents a view of the transmission shifting mechanism taken along the line 4—4 of Figure 1 in the direction of the arrows; and Figure 5 represents a partially broken-away view of the transmission shifting mechanism of Figure 1 taken along the line 5—5 thereof in the direction of the arrows.

Referring to the drawings and in particular Figure 1, an engine block 10 has secured thereto a transmission 12 having a reverse and low speed range arm 14, and a second and high speed range arm 16 extending to the exterior thereof and which are respectively connected by rods 15 and 17 to shifting levers 18 and 20 of the shifting device generally designated 22 and secured to the steering column 24. A gearshift cane 26 is secured to the head 28 of the steering column in the conventional manner and is secured at its other end to the gearshift device 22 in the manner described below in Figures 4 and 5.

Referring to Figures 4 and 5, it is seen that the shifting cane 26 is rotatably mounted in legs 30 and 32 of the shifting cane support 34 which is secured to the steering column 24 by means of the mounting band 36, bolt 38, and nut 40. Band 36 is inserted between the center portion of housing 34 and cane 26. Shifting cane 26 is also slidably received in the low and reverse speed range shift collar 42 and the second and high speed range shift collar 44 to which are respectively attached the shifting levers 18 and 20. The shifting levers 18 and 20 may be secured to their respective collars by any suitable means such as welding or by a frictional fit of apertured ones of these shifting levers over the ends of their respective collars. The shifting cane 26 is longitudinally slidable within the legs 30 and 32 and collars 42 and 44 and is limited in its longitudinal movement only by the shifting pin 46 secured to the cane 26 and slidable in the U-shaped notches 48 and 50 in collars 44 and 42 respectively.

It is noted that the notches 48 and 50 are automatically aligned when the manual shift stick 52, as shown in Figure 2, is in the neutral position during which none of the driving and driven gears in the gearing box 12 are operatively engaged with the driveshaft.

As shown in Figure 5, the shifting lever 18 is provided with an aperture 54 into which a locking pin 56 is slidably received. Pin 56 is secured to the spring clamp member 58 which holds friction material 60 comprising a nylon or other flexible friction-producing material, against the shifting cane 26. Leg 30 provided with aperture 55 provides a bearing in which pin 56 may slide. It is seen that longitudinal movement of the shifting cane 26 will carry the clamp 58 along with it due to the retaining clips 61 secured to cane 26 on either side of clamp 58 and thereby move the locking pin 56 in and out of the aperture 54 in lever 18. The disengaged position of the pin 56 and clamp 58 is represented by the dotted lines in Figure 5 and it is noted that in this position pin 56 is still in bearing aperture 55 and clamp 58 is thereby held against rotation relative to support 34.

It is obvious that a locking pin and spring clamp equivalent to pin 56 and clamp 58 could be mounted on end portion 59 of cane 26 and in leg 32 of support 34 to provide a lock means for lever 20 in the same manner as for lever 18 should it be found necessary to lock lever 20.

Referring to Figure 3, the transmission 12 comprises a drive shaft 68 adapted to be driven directly from the engine, and is provided with a drive gear 70 and direct drive spline segments 72. A driven shaft 74 is rotatably mounted in housing 12 at one end and internally of the end of drive shaft 68 to rotate independently of shaft 68. Shaft 74 is provided on one end with splines 76 and a first and reverse range driven gear 77 meshed on said splines 76 and selectively movable by shifting fork 64 to the right or left to engage either a reverse drive gear 78 or first drive gear 80 thereon. Splines 82 are provided on the other end of shaft 74 and second and high driven gear 84 is meshed therewith and movable by shifting fork 66 to the right or left to engage either the spline segments 86 on a second range drive gear 88 rotatably mounted on shaft 74, or the spline segments 72 on the direct drive shaft 68. Drive gear 88 is driven by the second range drive gear 90 in turn driven by drive take off gear 92. Gears 78, 80, 90, and 92 all form part of the drive shaft 68 through the interaction of the gears 70 and 92.

In operation of this shifting device, it is seen that movement of shifting pin 46 secured to shifting cane 26 to the left of Figure 5 will engage the sides of slot 48 and as the shifting cane is rotated either clockwise or counterclockwise collar 44 will rotate with it in the desired direction to thereby move shifting lever 20 and the shifting fork or yoke 66 in the transmission. At the same time that the shifting cane 26 is moved to the left in Figure 5 the pin 56 will slide into the aperture 54 in lever 18 and at the same time will be retained in aperture 55 in leg 30 of housing 34 to thereby lock shifting lever 18 and shifting yoke 64 associated with lever 18 against movement. Once the necessary rotative movement of the shifting cane 26 and the collar 44 has been accomplished to place the shifting yoke 66 in the proper position in the transmission, the frictional material 60 which is secured to the clamp 58 will hinder further rotative movement of the shifting cane 26 due to road and/or other vibration since the friction material 60 is secured through the mechanical linkage of clamp 58, pin 56, and leg 30 in a stationary position and shifting cane 26 will not, therefore, be able to rotate to a degree necessary to disengage the transmission gearing arranged by collar 44 and lever 20 attached thereto. It is only through the actual manual manipulation of the shift stick 52 that sufficient rotative force is applied to shifting cane 26 to actually overcome frictional member 60 and engage the sides of groove 48 in the collar 44 to impart the necessary rotative force thereon to accomplish any shifting of the gears in the transmission.

As the low and reverse gearshifting is desired, the shifting cane 26 will be drawn to the right in Figure 5 to allow pin 46 to engage the sides of the groove 50 in collar 42, and at the same time pin 56 will be withdrawn from aperture 54 in the lever 18 and rotative movement of the shifting cane 26 will then be possible to cause the necessary rotative movement of the collar 42 and shift lever 18 to accomplish the low and reverse gear shifting. It has not been found necessary to provide a similar locking pin means to prevent turning of the collar 44 as collar 42 is being turned since there is little or no inertia tending to rotate collar 44 when shifting the transmission from the second and third gear train to the low and reverse train, and also since a rapidly turning gear such as the reverse drive gear 78 is not present when shifting down to either first or reverse.

I claim:

1. In a gear shift mechanism, first and second gear shift lever means angularly movably mounted on a housing secured to a steering column, portions of said lever means forming shoulders, a longitudinally and angularly movable actuating member for selectively engaging said shoulders and angularly moving said lever means, bearing means on said housing, collar means on said actuating member rotatably frictionally engaging the same, means on said actuating member engaging said collar means for preventing relative axial movement therebetween, stud means on said collar means extending toward one of said lever means and constantly at least partially engaged by said bearing means, aperture means in said one lever means, said stud means being inserted into said aperture means at one longitudinal position of said actuating member to prevent angular movement of said one lever means during movement of the other lever means.

2. In a gear shift mechanism, first and second gear shift lever means rotatably mounted on a housing secured to a steering column, portions of said lever means forming shoulders, a longitudinally and rotatably movable actuating shaft having a projection for selectively engaging said shoulders and rotatably moving said lever means, bearing means on said housing, collar means on said actuating shaft rotatably frictionally engaging the same, means on said actuating shaft engaging said collar means for preventing relative axial movement therebetween, stud means on said collar means extending through said bearing means toward one of said lever means and at least partially engaged by said bearing means, aperture means in said one lever means, said stud means being inserted into said aperture means at one longitudinal position of said actuating member to prevent angular movement of said one lever means during movement of the other lever means.

References Cited in the file of this patent

UNITED STATES PATENTS

| 2,785,585 | Dick | Mar. 19, 1957 |
| 2,792,717 | Adams | May 21, 1957 |

FOREIGN PATENTS

| 966,844 | France | Mar. 15, 1950 |